(12) United States Patent
Brisby

(10) Patent No.: US 6,338,458 B1
(45) Date of Patent: Jan. 15, 2002

(54) WRIST REST FOR USE WITH COMPUTER MOUSE

(76) Inventor: Stewart P. Brisby, 463 West. St. #G-113, New York, NY (US) 10014-2029

( * ) Notice: Subject to any disclaimer, the term of this patent is extended or adjusted under 35 U.S.C. 154(b) by 0 days.

(21) Appl. No.: 09/707,373

(22) Filed: Nov. 6, 2000

Related U.S. Application Data

(60) Provisional application No. 60/189,371, filed on Mar. 15, 2000.

(51) Int. Cl.[7] ............................................... B68G 5/00
(52) U.S. Cl. ...................................... 248/118; 248/918
(58) Field of Search .............................. 248/118.1, 118, 248/918, 346.01, 346.03

*Primary Examiner*—Ramon O. Ramirez
*Assistant Examiner*—A. Joseph Wujciak

(74) *Attorney, Agent, or Firm*—Abelman, Frayne & Schwab

(57) ABSTRACT

A wrist rest for use with a computer mouse includes a base adapted to rest upon a flat surface, said base having a first upper surface adapted to support a computer mouse. A right rest is positioned at a right side of the base and has a second upper surface adapted to support a user's right wrist, with the second upper surface being upwardly spaced from the first upper surface. Correspondingly, a left rest is positioned at a left side of the baseand has a third upper surface adapted to support a user's left wrist, with the third upper surface being upwardly spaced from the first upper surface. The right rest and left rest define therebetween a recess with the first upper surface serving as a bottom surface of the recess, and the recess is sized such that when the user's right wrist is supported by the second upper surface, the user's right hand curves naturally down to a computer mouse positioned on the first upper surface and such that when the user's left wrist is supported by the third upper surface, the user's left hand curves naturally down to the computer mouse positioned on the first upper surface.

20 Claims, 3 Drawing Sheets

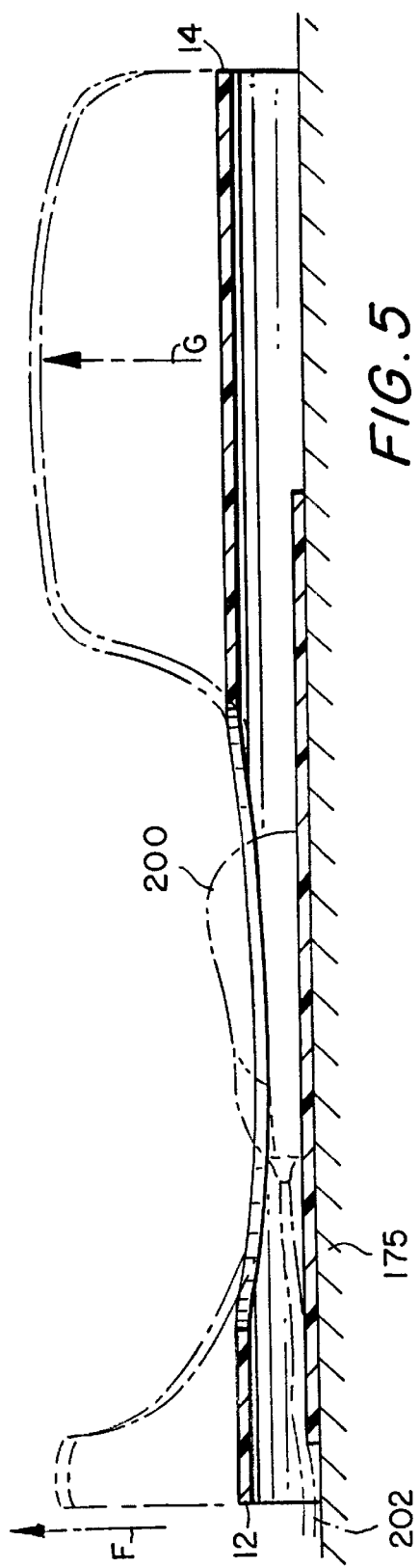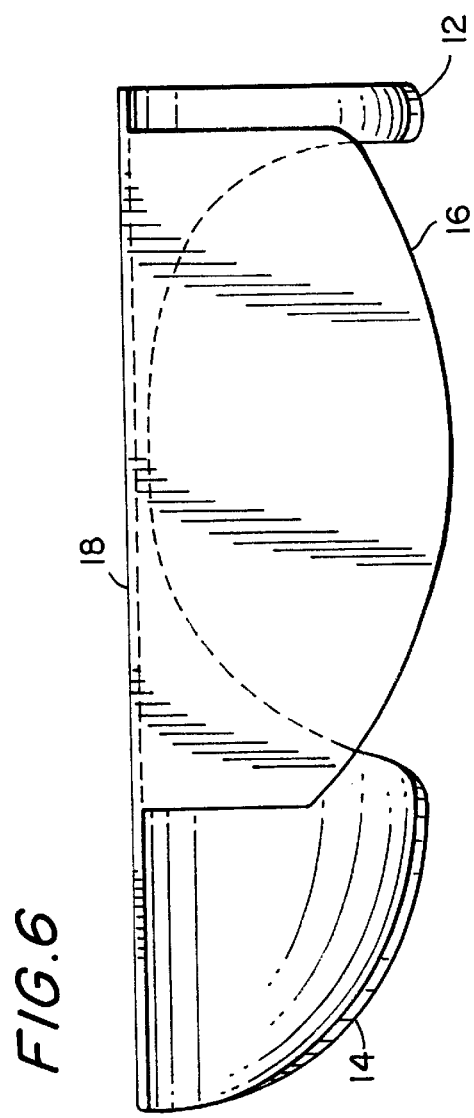

WRIST REST FOR USE WITH COMPUTER MOUSE

CROSS-REFERENCE TO RELATED APPLICATION

This application claims the benefit of U.S. provisional application No. 60/189,371, filed Mar. 15, 2000.

BACKGROUND OF THE INVENTION

1. Field of the Invention

This invention relates to systems and products for use with computers and computer input devices for control of the cursor on computer display monitors and with computer keyboards.

2. Description of Related Art

The most commonly used cursor control display devices, generally used in combination with a keyboard, are a mouse, a trackball and a touch pad. Of these, the most efficient, easy to use and popular is the mouse. Conventional mouse pads are sometimes combined with wrist rests and place the mouse pad on the left or right side of the keyboard. Alternatively, some conventional keyboards have wrist rests affixed that accommodate either touch pads or track balls. Thus, current mouse pads, whether combined with a wrist rest or not, force the computer operator to stretch his/her arm to the right or left side of the keyboard depending upon which hand is the dominant hand. Too often, this results in painful and sometimes disabling repetitive motion injuries. Moreover, this positioning is inefficient for entering data into the computer.

A system that would allow the computer operator to use the mouse without having to extend his arm would significantly increase productivity and assist in the prevention of repetitive motion injury. However, there is no known system that allows a computer operator to use the mouse in the position in which his hands naturally fall when typing on a computer keyboard.

SUMMARY OF THE INVENTION

Accordingly, it is an object of the present invention to provide a system and product that avoids the above-noted difficulties of the prior art.

It is a further object of the present invention to provide an ergonomic system of computer data entry combining a computer wrist rest and a mouse pad.

It is yet a further object of the present invention to provide an ergonomic system and product that combines a computer wrist rest and mouse pad in a unique position that allows a computer operator to more efficiently enter data into a computer by using the computer mouse in a more ergonomic position.

In accordance with these and other objects, a wrist rest for use with a computer mouse includes a base adapted to rest upon a flat surface, said base having a first upper surface adapted to support a computer mouse. A right rest is positioned at a right side of the base and has a second upper surface adapted to support a user's right wrist, with the second upper surface being upwardly spaced from the first upper surface. Correspondingly, a left rest is positioned at a left side of the base and has a third upper surface adapted to support a user's left wrist, with the third upper surface being upwardly spaced from the first upper surface. The right rest and the left rest define therebetween a recess with the first upper surface serving as a bottom surface of the recess, and the recess is sized such that when the user's right wrist is supported by the second upper surface, the user's right hand curves naturally down to a computer mouse positioned on the first upper surface and such that when the user's left wrist is supported by the third upper surface, the user's left hand curves naturally down to the computer mouse positioned on the first upper surface.

BRIEF DESCRIPTION OF THE DRAWINGS

FIG. 5 is a cross-sectional view of the wrist rest during the operation of FIG. 4, taken in the direction of line 5—5 of FIG. 2; and FIG. 6 is a bottom view of the wrist rest of FIG. 1.

DETAILED DESCRIPTION OF PREFERRED EMBODIMENTS

In order to avoid the above-noted difficulties of the prior art, such as the occurrence of repetitive motion injuries and the inefficiency of data entry due to the improper placement of the computer operator's hands, the present invention provides a structure that allows the computer operator to use the mouse in its most natural position when the operator's hands are on the keyboard, i.e. between the operator's wrists just below his hands. This position eliminates the need for the operator to extend his arm past the right or left edge of the keyboard each time he needs to reach the mouse, and accordingly eliminates the need for the operator to control the mouse with his arm in this extended position. As a result, this structure significantly relieves and helps prevent arm, shoulder, and back pain caused by using the mouse with the arm outstretched, saves desk top space by eliminating the mouse pad at the side of the keyboard, saves time and wasted motion by reducing the distance needed to reach the mouse and the time it takes to repeatedly move the hand from the typing position to the mouse, and significantly reduces the arm motion required to manipulate the mouse, leading to less stress and hence fewer stress injuries. The reduction of stress in turn leads to a more ergonomic, and hence more efficient, mode of data entry.

Figure 1:
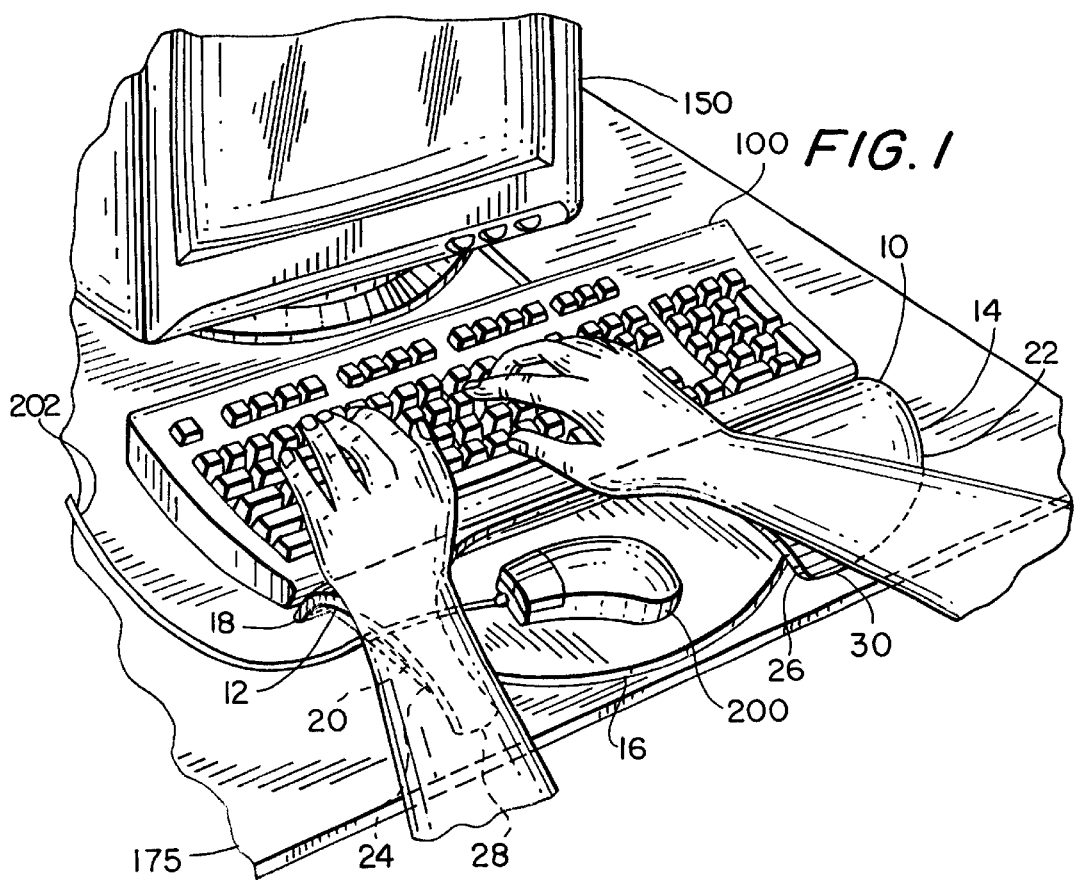
FIG. 1 is a perspective view of a first embodiment of the wrist rest in accordance with the present invention.
Figure 3:
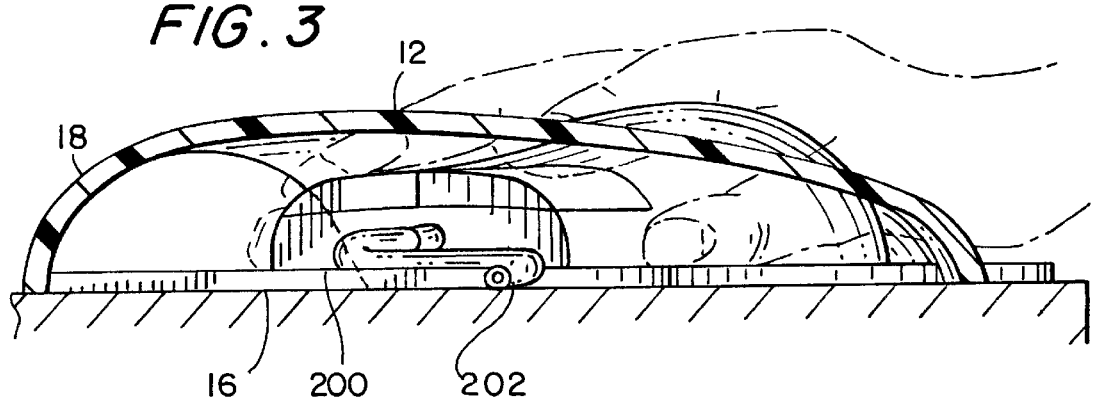
FIG. 3 is a cross-sectional view of the wrist rest of FIG. 1, taken in the direction of line 3—3 of FIG. 2.

FIG. 1 illustrates a first embodiment of the present invention in the form of a wrist rest 10 adapted to be used in combination with a keyboard 100 of a computer 150 and a mouse 200. The wrist rest 10 includes a left rest 12 and a right rest 14 adapted to respectively support the operator's left and right wrists. The rests 12 and 14 extend from a flat base 16 that supports the wrist rest 10 on the surface of a desk or table 175. As shown in FIGS. 1 and 3, each of the rests 12, 14 extends upwardly from the base 16 at a rear portion 18 of the base 10 and then extends forward and down to present a smooth, curved upper surface 20, 22 upon which the operator's wrists may lean. Accordingly, tunnels 24, 26 are respectively formed to between the base 10 and the rests 12, 14 through which may pass, for example, the cord 202 of the mouse 200, as shown in FIG. 1. The front portions 28, 30 of the rests 12, 14 curve down to touch, or almost touch, the surface of the desk or table 175 upon which the base 16 rests, and therefore serve to trap the mouse cord 202 to the side and out of the operator's way.

Figure 2:
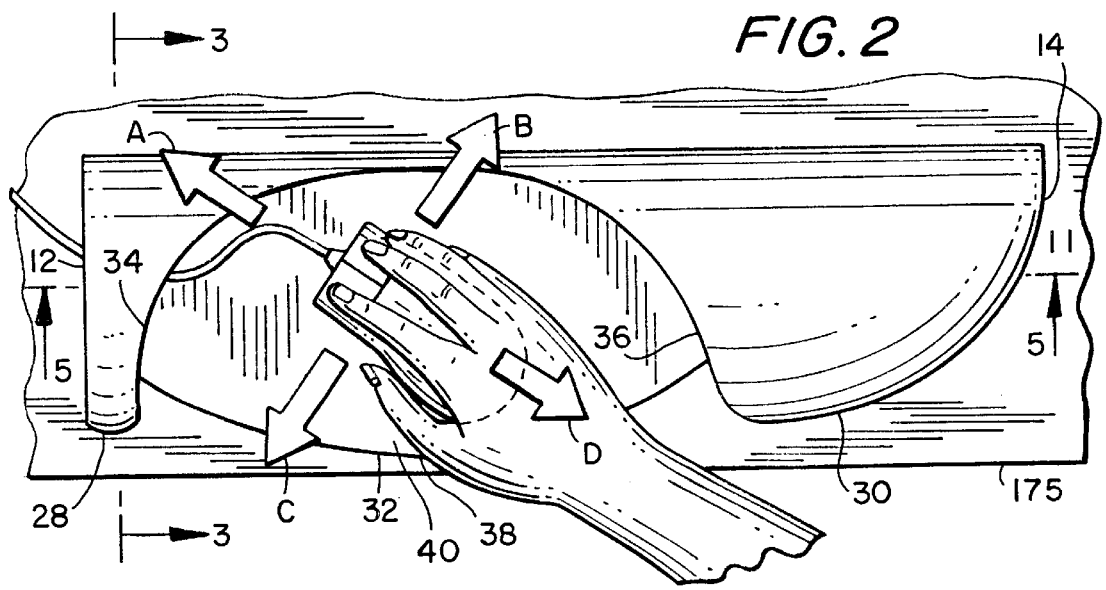
FIG. 2 is a top view of the wrist rest of FIG. 1, showing a computer mouse in use in the recess provided by the wrist rest shown in FIG. 1.

As shown in FIG. 2, the space between the left and right rests 12, 14 exposes a portion 32 of the base 16. The inner edges 34, 36 of the rests 12, 14 are curved so that they form a substantially semicircular cutout exposing the portion 32. Correspondingly, the forward edge 38 of the portion 32 is also substantially semicircular. The mouse 200 is intended to rest on the portion 32 between the rests 12, 14, where it is accessible to the operator using either his left hand or his right hand. The upper surface 40 of the portion 32 may be designed to have a suitable frictional quality for dragging the mouse 200, in which case the mouse 200 may be used directly on the portion 32, or a mouse pad (not illustrated) can be placed on the portion 32, or attached thereto, and the mouse 200 used on the mouse pad. The portion 32 is therefore sized to accommodate a standard mouse with sufficient area to permit the mouse to be moved about effectively without running into the rests 12, 14. Accordingly, the volume defined by the portion 32 between the left and right rests 12, 14 forms a recess in which the mouse 200 may be readily manipulated or left when not in use. FIG. 2 illustrates the mouse 200 in use within the recess, being movable in all directions as indicated by the arrows A, B, C, D. During such use, the operator's right wrist can rest upon the right rest 14 for small mouse movements, or can be lifted and moved from the right rest 14 for larger mouse movements, as shown in FIG. 2. The left wrist (not illustrated) may continue to rest upon the left rest 12.

The position of the operator's hand in manipulating the mouse 200 using the wrist rest 10 is illustrated in FIG. 3, which views the wrist rest 10 from the left through the tunnel 24 along line 3—3 in FIG. 2. As shown in FIG. 3, the operator's right hand may be supported at the wrist by the right rest 14, leaving the right hand itself free to droop in a natural curve down from the right rest 14 so that the operator's fingers naturally reach and curve around the mouse 200, with the operator's thumb optionally lying on the base 16 (or a mouse pad thereon) or contacting the mouse 200. This natural position is ergonomic and comfortable, permitting the operator to continue data entry and manipulation for a longer period with substantially less physical stress. As a result, fewer stress injuries will occur, the operator can concentrate more fully on the work without being distracted by discomfort or pain and can operate the computer more efficiently due to the reduction of distance between mouse and keyboard.

To achieve this natural position of the hands, the left and right rests 12, 14 are designed to rise approximately one inch above the base 10. To accommodate operators with particularly large or small hands, these heights can be varied.

Thus, the wrist rest 10 places the mouse between and just below the operator's hands, rather than to the left or right of a keyboard, as in conventional wrist supports and mouse pads. Moreover, when the wrist rest 10 is positioned at the front of a computer keyboard 100, as shown in FIG. 1, the operator can easily swivel or move his hands to reach the keyboard 100 with relatively little effort or motion. During typing, the mouse 200 itself can be simply left in place on the base 16, ready for the operator to return to it. Moreover, the mouse is readily available to either hand, so that its use is made even easier.

It will be noted that the orientation of the mouse in FIG. 1 relative to the keyboard is a parallel orientation, rather than the perpendicular orientation usually found. This orientation can be accommodated by setting the orientation tab on mouse properties software, so that the mouse can be used comfortably at this angle. Tests conducted using the Microsoft® Windows 98 Control Panel/Mouse Properties software and the Logitech® Mouse Properties software have shown that even at the lowest possible setting, it only takes 2½ inches of mouse movement to move the mouse pointer from one edge of the computer screen to another. Accordingly, while the overall width of the wrist rest 10 combining the widths of the rests 12, 14 and the base 16, as shown in FIG. 6, is advantageously approximately 18 inches from left to right, the width of a standard keyboard, the width of the base 16 is advantageously 10½ inches and the exposed portion 32 of the base 16 is advantageously approximately 6½ inches from left to right and approximately 5½ inches from top to bottom. This is more than ample room for the mouse 200 to move the mouse pointer across the computer screen without the operator having to stretch his arm past the edge of the keyboard 100 and risk repetitive motion strain on the arm shoulder and back. Of course, the recess can have a greater or smaller size depending on the requirements of a particular system.

In an alternative embodiment, the base 16 can have a straight, rather than semicircular, forward edge, in which case the base 16 is advantageously a rectangle approximately 6½ inches by 10½ inches. If a mouse pad is used, the mouse pad can advantageously be ¼ inch thick and attached approximately ½ inch from the top of the base 16, extending downward 5½ inches and forming a tongue-like shape that is semicircular at the bottom.

The same tests show that when the computer operator is typing, the mouse 200 fits comfortably between the operator's wrists at the bottom of the recess and does not impede data entry.

Figure 4:
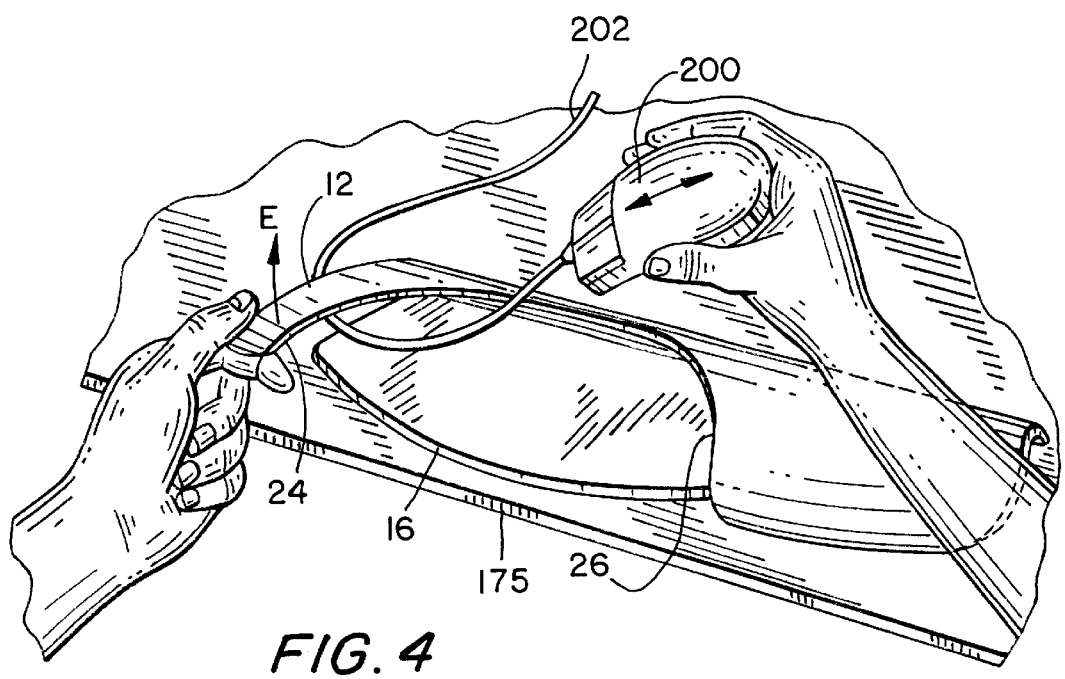
FIG. 4 is an illustration of the use of the wrist rest of FIG. 1.

FIG. 3 also illustrates how the extension of the mouse cord 202 out through tunnel 24 assists the operator by keeping the mouse cord 202 out of the way as the mouse 200 is moved about. As shown in FIGS. 4 and 5, the mouse cord 202 can be easily inserted to extend through tunnel 24 by making the left rest 12 flexible enough to be lifted up, as shown by arrows E and F, to allow the mouse cord 202 to pass through tunnel 24. Alternatively, the left rest 12 can be designed to extend in its normal position beyond the base 16, leaving a gap between the end of left rest 12 and the base 16. In either case, because the end of left rest 12 is designed to touch or almost touch the table 175, the mouse cord 202 will still be held in place off to the left while the mouse 200 is in use.

Correspondingly, the mouse cord 202 can be easily inserted to extend through tunnel 26 by making the right rest 14 flexible enough to be lifted up, as shown by arrow G, to allow the mouse cord 202 to pass through tunnel 26. Alternatively, the right rest 14 can be designed to extend in its normal position beyond the base 16, leaving a gap between the end of right rest 14 and the base 16. In either case, because the end of left rest 14 is designed to touch or almost touch the table 175, the mouse cord 202 will still be held in place off to the left while the mouse 200 is in use.

The rests 12, 14 may each independently be formed integrally with the base 16, may be attached to the base 16 or may be a separate structure from the base 16. The rests 12, 14 may correspondingly be formed of the same material as the base 16, such as plastic, or may be formed of some other material or other grade of material such as a heavier or lighter plastic. The rests further can be provided with rounded ends to accommodate the operator's hands, as shown in FIG. 1, or can have a constant width.

Because the recessed base 16 is centered below the typing keys, the rights wrist rest 14 is necessarily relatively wide, for example 9 inches, in order to mirror the off-center position of the typing keys on standard keyboards. The left wrist rest 12, on the other hand is relatively narrow, for example 2½ inches for the same reason—to mirror the off-center setup of standard keyboards and center the base 16 beneath the typing keys to accommodate the natural position of the hands when typing. The wider right wrist rest also serves to accommodate the exit of the mouse cord through the right tunnel 26 and to hold the mouse cord in place when the invention is used by a left-handed operator.

Tests reveal that only the outer portion of the wrists and palms actually make contact with a standard wrist rest when typing and that most of its frontal area is left unused. This invention centers its recessed base 16 below the typing keys in that unused frontal area—in the empty space that forms naturally between the wrists when the hands are typing on a keyboard—and retains at the perimeter of the semicircular inner edges of the wrist rests 34,36 the parts of the wrist rest that actually make contact with the wrists and palms. These tests show that the 2½ inch left wrist rest 12 is more than ample to accommodate the portion of the left wrist and palm that actually make contact with the rest.

The wrist rest 10 can be separate from the keyboard 100, integral with the keyboard 100, or attachable or attached thereto.

While the present invention has been described with reference to the foregoing embodiments, changes and variations may be made therein which fall within the scope of the appended claims. All such modifications and/or changes are intended to be within the scope of the claims.

What is claimed is:

1. A stationary wrist rest for use with a computer mouse, comprising:
    a base adapted to rest upon a flat surface, said base having a first upper surface adapted to support a computer mouse;
    a right rest positioned at a right side of said base, said right rest having a second upper surface adapted to support a user's right wrist, said second upper surface being upwardly spaced from said first upper surface; and
    a left rest positioned at a left side of said base, said left rest having a third upper surface adapted to support a user's left wrist, said third upper surface being upwardly spaced from said first upper surface,
    the positions of said base, right rest and left rest being fixed with respect to each other,
    said right rest and said left rest defining therebetween a recess with said first upper surface serving as a bottom surface of said recess, and
    said recess being sized such that when the user's right wrist is supported by said second upper surface, the user's right hand curves naturally down to a computer mouse positioned on said first upper surface and such that when the user's left wrist is supported by said third upper surface, the user's left hand curves naturally down to the computer mouse positioned on said first upper surface.

2. The wrist rest of claim 1, wherein said right rest is wider than said left rest.

3. The wrist rest of claim 1, wherein said right rest and said base form a tunnel therebetween sized to trap a mouse cord therein.

4. The wrist rest of claim 3, wherein said right rest is flexible to permit a spacing between said right rest and said base sized to permit the mouse cord to be inserted in said tunnel.

5. The wrist rest of claim 3, wherein said right rest terminates in a forward edge that extends in its normal position beyond the base to form a gap between said right rest and said base, whereby the mouse cord can be placed in said tunnel.

6. The wrist rest of claim 1, wherein said left rest and said base form a tunnel therebetween sized to trap a mouse cord therein.

7. The wrist rest of claim 6, wherein said left rest is flexible to permit a spacing between said left rest and said base sized to permit the mouse cord to be inserted in said tunnel.

8. The wrist rest of claim 6, wherein said left rest terminates in a forward edge that extends in its normal position beyond the base to form a gap between said left rest and said base, whereby the mouse cord can be placed in said tunnel.

9. The wrist rest of claim 1, wherein said first upper surface within said recess is sized to accommodate the operating characteristics of the computer mouse, whereby the computer mouse can be effectively moved without impediment from said left and right rests.

10. The wrist rest of claim 1, wherein said wrist rest is attachable along a back portion thereof to a front edge of a computer keyboard.

11. A keyboard/wrist rest system for use with a computer mouse, comprising:
    a keyboard for a computer, said keyboard having a front edge having a first width; and
    a stationary wrist rest, said wrist rest having a back portion having a second width substantially equal to said first width, said keyboard and said wrist rest being attached along said front edge and said back portion, said wrist rest comprising:
        a base adapted to rest upon a flat surface, said base having a first upper surface adapted to support a computer mouse;
        a right rest positioned at a right side of said base, said right rest having a second upper surface adapted to support a user's right wrist, said second upper surface being upwardly spaced from said first upper surface; and
        a left rest positioned at a left side of said base, said left rest having a third upper surface adapted to support a user's left wrist, said third upper surface being upwardly spaced from said first upper surface,
        the positions of said base, right rest and left rest being fixed with respect to each other,
        said right rest and said left rest defining there between a recess with said first upper surface serving as a bottom surface of said recess, and
        said recess being sized such that when the user's right wrist is supported by said second upper surface, the user's right hand curves naturally down to a computer mouse positioned on said first upper surface and such that when the user's left wrist is supported by said third upper surface, the user's left hand curves naturally down to the computer mouse positioned on said first upper surface.

12. The system of claim 11, wherein said right rest is wider than said left rest.

13. The system of claim 11, wherein said right rest and said base form a tunnel therebetween sized to trap a mouse cord therein.

14. The system of claim 13, wherein said right rest is flexible to permit a spacing between said right rest and said base sized to permit the mouse cord to be inserted in said tunnel.

15. The system of claim 14, wherein said left rest terminates in a forward edge that extends in its normal position beyond the base to form a gap between said forward edge of left rest and said base, whereby the mouse cord can be passed through said gap and into said tunnel.

16. The system of claim 11, wherein said right rest terminates in a forward edge that extends in its normal position beyond the base to form a gap between said forward edge of right rest and said base, whereby the mouse cord can be passed through said gap and into said tunnel.

17. The system of claim 11, wherein said left rest and said base form a tunnel therebetween sized to trap a mouse cord therein.

18. The system of claim 17, wherein said left rest is flexible to permit a spacing between said left rest and said base sized to permit the mouse cord to be inserted in said tunnel.

19. The system of claim 11, wherein said first upper surface within said recess is sized to accommodate the operating characteristics of the computer mouse, whereby the computer mouse can be effectively moved without impediment from said left and right rests.

20. A method for supporting a user's hands in an ergonomic position while using a computer mouse, comprising the steps of:

providing a base adapted to rest without movement upon a flat surface, said base having a first upper surface adapted to support a computer mouse;

providing a fixed right rest positioned at a right side of said base, said right rest having a second upper surface adapted to support a user's right wrist, said second upper surface being upwardly spaced from said first upper surface; and providing a fixed left rest positioned at a left side of said base, said left rest having a third upper surface adapted to support a user's left wrist, said third upper surface being upwardly spaced from said first upper surface, said right rest and said left rest defining therebetween a recess with said first upper surface serving as a bottom surface of said recess, and said recess being sized such that when the user's right wrist is supported by said second upper surface, the user's right hand curves naturally down to a computer mouse positioned on said first upper surface and such that when the user's left wrist is supported by said third upper surface, the user's left hand curves naturally down to the computer mouse positioned on said first upper surface.

* * * * *